(12) United States Patent
McFadden et al.

(10) Patent No.: US 8,658,953 B2
(45) Date of Patent: Feb. 25, 2014

(54) ANTENNA COVER FOR MICROWAVE OVENS

(75) Inventors: David H. McFadden, Lexington, MA (US); David A. Bolton, Southlake, TX (US)

(73) Assignee: Turbochef Technologies, Inc., Carrollton, TX (US)

( * ) Notice: Subject to any disclaimer, the term of this patent is extended or adjusted under 35 U.S.C. 154(b) by 60 days.

(21) Appl. No.: 11/928,007

(22) Filed: Oct. 30, 2007

(65) Prior Publication Data

US 2008/0106483 A1 May 8, 2008

Related U.S. Application Data

(63) Continuation-in-part of application No. 11/098,280, filed on Apr. 4, 2005, now Pat. No. 7,360,533, and a continuation-in-part of application No. 10/614,268, filed on Jul. 7, 2003, now Pat. No. 7,836,874, and a continuation-in-part of application No. 10/614,532, filed on Jul. 7, 2003, now Pat. No. 8,297,270, and a continuation-in-part of application No. 11/392,050, filed on Mar. 29, 2006, now Pat. No. 7,836,875.

(51) Int. Cl.
*H05B 6/72* (2006.01)
*H05B 6/70* (2006.01)
*H05B 6/74* (2006.01)

(52) U.S. Cl.
USPC ............ 219/748; 219/695; 219/691; 219/746

(58) Field of Classification Search
USPC ......... 219/748, 690, 749, 750, 751, 685, 738, 219/698, 699, 695, 746; 343/872
See application file for complete search history.

(56) References Cited

U.S. PATENT DOCUMENTS

| 2,563,253 A | 8/1951 | Levin |
| 2,704,802 A | 3/1955 | Blass et al. |
| 3,210,511 A | 10/1965 | Smith |

(Continued)

FOREIGN PATENT DOCUMENTS

| CN | 2348616 | 11/1999 |
| DE | 2557867 | 6/1977 |

(Continued)

OTHER PUBLICATIONS

International Search Report and Written Opinion dated Feb. 11, 2009 in related Application No. PCT/US2008/081689.

(Continued)

*Primary Examiner* — Henry Yuen
*Assistant Examiner* — Hung D Nguyen
(74) *Attorney, Agent, or Firm* — Dean W. Russell; Kristin M. Crall; Kilpatrick Townsend & Stockton LLP

(57) ABSTRACT

An antenna cover assembly for a high-temperature operating environment has a cover plate, gasket portions, and a retainer plate. The cover plate has an inner side and an outer side, the cover plate being translucent to at least one selected frequency of electromagnetic energy. The gasket portions are each located adjacent one of the inner and outer sides, each gasket portion being configured for sealingly engaging the adjacent side. The retainer plate is configured for attachment to a structure located in a high-temperature operating environment. The retainer plate has a sealing flange adapted for clamping the cover plate generally adjacent an antenna portion of a waveguide.

11 Claims, 2 Drawing Sheets

(56) References Cited

U.S. PATENT DOCUMENTS

| | | | |
|---|---|---|---|
| 3,263,052 A * | 7/1966 | Jeppson et al. | 219/700 |
| 3,321,314 A * | 5/1967 | Jeppson | 219/699 |
| 3,328,800 A * | 6/1967 | Algeo | 343/768 |
| 3,548,152 A | 12/1970 | Klepzig | |
| 3,581,038 A | 5/1971 | Williams | |
| 3,813,216 A | 5/1974 | Baur et al. | |
| 3,828,760 A | 8/1974 | Farber et al. | |
| 3,973,551 A | 8/1976 | Caselani et al. | |
| 4,133,997 A * | 1/1979 | Thuleen | 219/748 |
| 4,154,861 A | 5/1979 | Smith | |
| 4,160,144 A | 7/1979 | Kashyap et al. | |
| 4,160,145 A | 7/1979 | Rueggeberg | |
| 4,210,793 A * | 7/1980 | Fournet-Fayas | 219/691 |
| 4,283,614 A | 8/1981 | Tanaka et al. | |
| 4,316,069 A | 2/1982 | Fitzmayer | |
| 4,320,275 A * | 3/1982 | Reiss | 219/685 |
| 4,327,274 A | 4/1982 | White et al. | |
| 4,327,279 A | 4/1982 | Guibert | |
| 4,337,384 A | 6/1982 | Tanaka et al. | |
| 4,338,911 A | 7/1982 | Smith | |
| 4,350,504 A | 9/1982 | Diachuk | |
| 4,351,998 A * | 9/1982 | Keppel et al. | 219/757 |
| 4,354,083 A | 10/1982 | Staats | |
| 4,403,128 A | 9/1983 | Takagi et al. | |
| 4,409,453 A | 10/1983 | Smith | |
| 4,431,889 A | 2/1984 | Saponara et al. | |
| 4,464,554 A | 8/1984 | Bakanowski et al. | |
| 4,480,164 A | 10/1984 | Dills | |
| 4,481,396 A | 11/1984 | Matsubayashi et al. | |
| 4,494,525 A | 1/1985 | Albertsen | |
| 4,516,012 A | 5/1985 | Smith et al. | |
| 4,737,373 A | 4/1988 | Forney | |
| 4,743,728 A | 5/1988 | Nagafusa et al. | |
| 4,752,268 A | 6/1988 | Kataoka et al. | |
| 4,786,774 A | 11/1988 | Kaminaka | |
| 4,849,597 A | 7/1989 | Waigand | |
| 4,924,763 A | 5/1990 | Bingham | |
| 4,949,629 A | 8/1990 | Leary et al. | |
| 4,958,412 A | 9/1990 | Stanek | |
| 4,965,435 A | 10/1990 | Smith et al. | |
| 5,025,775 A | 6/1991 | Crisp | |
| 5,155,318 A | 10/1992 | Bowen | |
| 5,161,889 A | 11/1992 | Smith et al. | |
| 5,166,487 A | 11/1992 | Hurley et al. | |
| 5,204,503 A | 4/1993 | Maiellano et al. | |
| 5,277,105 A | 1/1994 | Bruno | |
| 5,369,250 A | 11/1994 | Meredith | |
| 5,401,940 A | 3/1995 | Smith et al. | |
| 5,555,795 A | 9/1996 | Tsai | |
| 5,676,870 A | 10/1997 | Wassman et al. | |
| 5,717,192 A | 2/1998 | Dobie et al. | |
| 5,825,000 A | 10/1998 | Jun | |
| 5,826,496 A | 10/1998 | Jara | |
| 5,927,265 A | 7/1999 | McKee et al. | |
| 5,934,178 A | 8/1999 | Caridis et al. | |
| 5,994,672 A | 11/1999 | Mestnik | |
| 6,012,442 A | 1/2000 | Faraj | |
| 6,058,924 A | 5/2000 | Pool et al. | |
| 6,060,701 A | 5/2000 | McKee et al. | |
| 6,114,664 A | 9/2000 | Cook et al. | |
| 6,250,296 B1 | 6/2001 | Norris et al. | |
| 6,291,808 B1 | 9/2001 | Brown | |
| 6,369,360 B1 | 4/2002 | Cook | |
| 6,376,817 B1 | 4/2002 | McFadden et al. | |
| 6,399,930 B2 | 6/2002 | Day et al. | |
| 6,403,937 B1 | 6/2002 | Day et al. | |
| 6,437,303 B1 | 8/2002 | Dorr et al. | |
| 6,472,640 B2 | 10/2002 | Brown et al. | |
| 6,472,647 B2 | 10/2002 | Lee et al. | |
| 6,481,999 B2 | 11/2002 | Knost | |
| 6,655,373 B1 | 12/2003 | Wiker | |
| 6,712,063 B1 | 3/2004 | Thorneywork | |
| 6,713,741 B2 | 3/2004 | Miller | |
| 6,874,495 B2 | 4/2005 | McFadden | |
| 6,909,078 B2 * | 6/2005 | Lee et al. | 219/756 |
| 7,055,518 B2 | 6/2006 | McFadden et al. | |
| 7,087,872 B1 | 8/2006 | Dobie et al. | |
| 7,360,533 B2 | 4/2008 | McFadden | |
| 7,424,848 B2 | 9/2008 | Jones et al. | |
| 7,468,495 B2 | 12/2008 | Carbone et al. | |
| 7,507,938 B2 | 3/2009 | McFadden | |
| 2001/0054605 A1 | 12/2001 | Suzuki et al. | |
| 2002/0179588 A1 | 12/2002 | Lubrina et al. | |
| 2003/0226452 A1 | 12/2003 | Artt | |
| 2004/0118392 A1 | 6/2004 | McFadden | |
| 2004/0123858 A1 | 7/2004 | McFadden et al. | |
| 2004/0200828 A1 | 10/2004 | Becker et al. | |
| 2004/0211765 A1 | 10/2004 | McFadden | |
| 2004/0216732 A1 | 11/2004 | McFadden | |
| 2005/0039613 A1 | 2/2005 | Kaminaka et al. | |
| 2005/0217503 A1 | 10/2005 | McFadden | |
| 2006/0169272 A1 | 8/2006 | McFadden et al. | |
| 2007/0137633 A1 | 6/2007 | McFadden | |
| 2007/0194011 A1 | 8/2007 | McFadden | |
| 2008/0099008 A1 | 5/2008 | Bolton et al. | |
| 2008/0105133 A1 | 5/2008 | McFadden et al. | |
| 2008/0105135 A1 | 5/2008 | McFadden et al. | |
| 2008/0105136 A1 | 5/2008 | McFadden | |
| 2008/0105249 A1 | 5/2008 | McFadden et al. | |
| 2008/0106483 A1 | 5/2008 | McFadden et al. | |
| 2008/0206420 A1 | 8/2008 | McFadden | |
| 2008/0216812 A1 | 9/2008 | Dougherty | |
| 2008/0296284 A1 | 12/2008 | McFadden et al. | |

FOREIGN PATENT DOCUMENTS

| | | |
|---|---|---|
| DE | 3119596 A * | 12/1982 |
| DE | 3119596 A1 | 12/1982 |
| DE | 8801849 U1 | 3/1988 |
| DE | 3734958 A1 | 4/1989 |
| EP | 0 096 159 | 12/1983 |
| EP | 0429822 | 6/1991 |
| EP | 0429822 A1 | 6/1991 |
| EP | 0534787 A1 | 3/1993 |
| GB | 2043237 | 10/1980 |
| GB | 2043247 | 10/1980 |
| JP | 62218736 A | 9/1987 |
| JP | 63-317068 | 12/1988 |
| JP | 2004349042 A * | 12/2004 |
| WO | WO 9836619 | 8/1998 |
| WO | WO 2004/014139 | 2/2004 |
| WO | WO 2005/041672 | 5/2005 |
| WO | WO 2005/087009 | 9/2005 |
| WO | WO 2006/041814 | 4/2006 |
| WO | WO 2006/081202 | 8/2006 |
| WO | WO 2006/099394 | 9/2006 |
| WO | WO2009058934 | 5/2009 |

OTHER PUBLICATIONS

Rueggeberg, 'A Multislotted Waveguide Antenna for High-Powered Microwave Heating Systems,' IEEE Transactions on Industry Applications, IA-16(6):809-813 (1980).

Supplementary Search Report dated Mar. 4, 2009 in related European Application No. 04816933.

Response dated Dec. 17, 2008 in related U.S. Appl. No. 10/591,074.

Response dated Jan. 16, 2009 in related U.S. Appl. No. 11/392,050.

Response dated Jan. 16, 2009 in related U.S. Appl. No. 10/614,532.

Office Action dated Feb. 5, 2009 in related U.S. Appl. No. 11/928,063.

Response dated Nov. 13, 2008 in related U.S. Appl. No. 11/663,253.

Office Action dated Mar. 18, 2009 in related U.S. Appl. No. 11/663,253.

Response dated Jan. 23, 2009 in related U.S. Appl. No. 10/614,268.

U.S. Appl. No. 11/908,169, filed Sep. 10, 2007, McFadden.

U.S. Appl. No. 11/928,037, filed Oct. 30, 2007, McFadden.

U.S. Appl. No. 12/045,063, filed Mar. 10, 2008, Dougherty.

Partial International Search report in related Application No. PCT/US2008/056358.

Office Action dated Oct. 3, 2008 in related U.S. Appl. No. 10/591,074.

(56) References Cited

OTHER PUBLICATIONS

Office Action dated Aug. 19, 2008 in related U.S. Appl. No. 11/663,253.
Office Action dated May 30, 2007 in related U.S. Appl. No. 10/614,268.
Response dated Nov. 30, 2007 in related U.S. Appl. No. 10/614,268.
Office Action dated Feb. 4, 2008 in related U.S. Appl. No. 10/614,268.
Response dated Aug. 4, 2008 in related U.S. Appl. No. 10/614,268.
Office Action dated Aug. 13, 2007 in related U.S. Appl. No. 10/576,847.
Response dated Feb. 12, 2008 in related U.S. Appl. No. 10/576,847.
Office Action dated Apr. 24, 2008 in related U.S. Appl. No. 10/576,847.
Response dated Oct. 7, 2008 in related U.S. Appl. No. 10/576,847.
Office Action dated Sep. 4, 2007 in related U.S. Appl. No. 11/392,050.
Response dated Mar. 6, 2008 in related U.S. Appl. No. 11/392,050.
Office Action dated Jul. 22, 2008 in related U.S. Appl. No. 11/392,050.
Office Action dated Jan. 25, 2005 in related U.S. Appl. No. 10/614,532.
Response dated Jun. 27, 2005 in related U.S. Appl. No. 10/614,532.
Office Action dated Sep. 22, 2005 in related U.S. Appl. No. 10/614,532.
Response dated Mar. 22, 2006 in related U.S. Appl. No. 10/614,532.
Office Action dated Apr. 7, 2006 in related U.S. Appl. No. 10/614,532.
Response dated Oct. 10, 2006 in related U.S. Appl. No. 10/614,532.
Office Action dated Jan. 11, 2007 in related U.S. Appl. No. 10/614,532.
Response dated Jul. 11, 2007 in related U.S. Appl. No. 10/614,532.
Office Action dated Sep. 27, 2007 in related U.S. Appl. No. 10/614,532.
Response dated Mar. 27, 2008 in related U.S. Appl. No. 10/614,532.
Office Action dated Jul. 23, 2008 in related U.S. Appl. No. 10/614,532.
Office Action dated Apr. 14, 2009 in related U.S. Appl. No. 10/614,532.
Response dated Jul. 7, 2009 in related U.S. Appl. No. 10/614,532.
Office Action dated Apr. 28, 2009 in related U.S. Appl. No. 10/614,268.
Response dated Jul. 7, 2009 in related U.S. Appl. No. 10/614,268.
Office Action dated Apr. 15, 2009 in related U.S. Appl. No. 11/392,050.
Response dated Jul. 7, 2009 in related U.S. Appl. No. 11/392,050.
Office Action dated Apr. 15, 2009 in related U.S. Appl. No. 10/591,074.
Abstract JP2000254001 published Mar. 8, 1999.
Office Action dated Oct. 1, 2009 in related U.S. Appl. No. 11/663,253.
Response dated Dec. 11, 2009 in related U.S. Appl. No. 11/908,169.
Office Action dated Nov. 23, 2009 in related U.S. Appl. No. 11/928,063.
Response dated Oct. 14, 2009 in related U.S. Appl. No. 10/591,074.
Office Action dated Dec. 28, 2009 in related U.S. Appl. No. 10/591,074.
Office Action dated Nov. 12, 2009 in related U.S. Appl. 10/614,532.
Office Action dated Sep. 14, 2009 in related U.S. Appl. No. 11/392,050.
Response dated Dec. 14, 2009 in related U.S. App. No. 11/392,050.
Response dated Jan. 5, 2010 in related U.S. Appl. No. 10/614,268.
Response dated Aug. 4, 2009 in related U.S. Appl. No. 11/928,063.
Office Action dated Jul. 15, 2009 in related U.S. Appl. No. 11/908,169.
Response dated Jul. 21, 2009 in related U.S. Appl. No. 11/663,253.

* cited by examiner

ANTENNA COVER FOR MICROWAVE OVENS

CROSS REFERENCE TO RELATED APPLICATIONS

This application is a continuation-in-part of U.S. patent application Ser. No. 11/098,280, filed on Apr. 4, 2005, now U.S. Pat. No. 7,360,533; and a continuation-in-part of U.S. patent application Ser. No. 10/614,268 filed on Jul. 7, 2003, now U.S. Pat. No. 7,836,874; and a continuation-in-part of U.S. patent application Ser. No. 10/614,532 filed on Jul. 7, 2003, now U.S. Pat. No. 8,297,270; and a continuation-in-part of U.S. Ser. No. 11/392,050 filed on Mar. 29, 2006, now U.S. Pat. No. 7,836,875.

The present application contains technical disclosure in common with International Application No. PCT/US2003/021225 filed 5 Jul. 2003; contains technical disclosure in common with International Application No. PCT/US2005/007261 filed 7 Mar. 2005; contains technical disclosure in common with U.S. Provisional Application No. 60/394,216 filed 5 Jul. 2002; contains technical disclosure in common with PCT/US2004/035252 filed 21 Oct. 2004; contains technical disclosure in common with International Application No. PCT/US2005/035605 filed 5 Oct. 2005; contains technical disclosure in common with International Application No. PCT/US2006/009075 filed 14 Mar. 2006; contains technical disclosure in common with U.S. Provisional Application No. 60/513,110 filed 21 Oct. 2003; contains technical disclosure in common with U.S. Provisional Application No. 60/513,111 filed 23 Oct. 2003; contains technical disclosure in common with U.S. Provisional Application No. 60/614,877 filed 30 Sep. 2004; contains technical disclosure in common with U.S. Provisional Application No. 60/551,268 filed 8 Mar. 2004; contains technical disclosure in common with U.S. Provisional Application No. 60/615,888 filed 5 Oct. 2004; and contains technical disclosure in common with U.S. Provisional Application No. 60/550,578 filed 5 Mar. 2004.

All of the applications set forth above are incorporated herein by reference as if fully set forth.

FIELD OF THE INVENTION

The present invention relates generally to covers for antennas and specifically to cover assemblies for slot antennas located within the cook chamber of an oven.

DESCRIPTION OF RELATED ART

A rapid-cook oven combines microwave (or radio frequency) cooking and convection cooking for cooking food products in a cook chamber. In one type of rapid-cook oven, the microwave portion comprises waveguides positioned along the left and right hand chamber walls. The covers (forming portions of cook chamber walls) of the waveguides are fitted with slotted antennas, which are slots formed in the waveguide cover. The slots are rectangular holes in the metal waveguides, and these may be, for example, approximately 2.39 inches long (6.07 cm) by approximately 0.25 inches wide (0.64 cm) (with rounded, or radiused, ends) for use with the energy frequency produced by 2.45 GHz magnetron tubes. These antennas are associated with standard 2.45 GHz magnetron tubes producing a maximum power level for the oven of around 1950 watts delivered to the food (or about 975 watts per tube). The number of slot antennas per side may vary, but current versions use 3 slot antennas per side.

The microwave slot antenna is within the cook chamber, and the antenna for a commercial oven may experience a maximum operating temperature of around 550° F. (287.78° C.). In addition, the antennas are open to the cooking chamber environment, so they must be sealed to prevent food particles, water, oil, cleaning agents, or other substances from being deposited in the waveguide. Contamination of the waveguide interior by such substances can reduce the life of the magnetron tube, reduce the useful power produced by the tube, and/or increase heat loss from the oven.

Although great strides have been made in the area of covers for microwave oven antennas, many short comings remain.

SUMMARY OF THE INVENTION

There is a need in the art for an improved cover for an antenna located within the cook chamber of an oven.

This object is achieved by providing an improved cover for an antenna located within the cook chamber of an oven.

An antenna cover assembly for a high-temperature operating environment has a cover plate, gasket portions, and a retainer plate. The cover plate has an inner side and an outer side, the cover plate being translucent to at least one selected frequency of electromagnetic energy. The gasket portions are each located adjacent one of the inner and outer sides, each gasket portion being configured for sealingly engaging the adjacent side. The retainer plate is configured for attachment to a structure located in a high-temperature operating environment. The retainer plate has a sealing flange adapted for clamping the cover plate generally adjacent an antenna portion of a waveguide.

DESCRIPTION OF THE DRAWINGS

The novel features believed to be characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

The present invention is directed to an improved antenna cover for ovens that operate using electromagnetic energy, such as microwave or radio frequency (RF) energy, emitted through slot antennas located in a high-temperature cook chamber, such as in a combination microwave and convection oven.

To reliably seal the slot antennas and associated waveguides while providing a low loss (E/H energy) interface to the cooking cavity, the present invention provides a very durable and low-cost cover for slot antennas. The cover plate material must be compatible with a high-temperature operating environment (such as the interior of a convention oven), must be of low-loss characteristics relative to microwave (or RF) transmission, easily cleaned, durable, and inexpensive.

Suitable cover plate, or window, material can be either flexible or rigid. For good microwave compatibility, materials with a dielectric constant less than approximately 6.0 and a loss tangent less than approximately 0.2 are preferred. In addition, the cover assembly must prevent moisture and/or grease form passing from the oven cavity to the interior of the waveguide.

Ceramic or rigid style cover plate materials include high-purity quartz and alumina. These materials have excellent high-temperature thermal characteristics, very good microwave transmission performance and offer good protection against user abuse. However, using these materials requires designs to be created with several considerations in mind.

For example, ceramic plates are susceptible to cracking or other damage if the window mounting structure that attaches the window to the oven cavity wall distorts, bends, or twists due to oven operation at an elevated temperature. When an oven wall made of sheet metal becomes hot, the wall distorts and can cause tensile stresses (primarily bending) in the ceramic window if the window is clamped directly to the cavity. In addition, these potential stresses increase as the size of the ceramic window increases.

Because ceramic cover plates have a very low coefficient of thermal expansion when compared to the oven sheet metal, another consideration is that bonding the ceramic directly to the sheet metal to create an edge seal is not effective for achieving a reliable, long-life seal. The seal is needed to prevent water and grease from seeping between the metal/ceramic interface, and a flexible interface gasket is required for good, long-life sealing. A further consideration is that high-purity ceramics are relatively expensive materials. To reduce material costs, the ceramics should cover only the slot antenna broadcast area and be as thin as possible.

Figure 1:
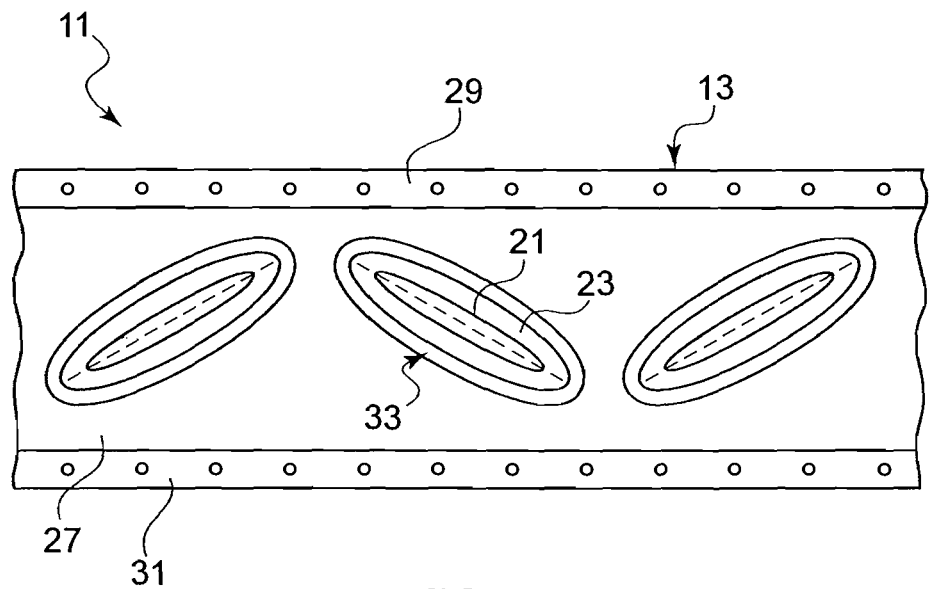
FIG. 1 is a front view of a portion of a waveguide and cover assembly according to the invention, the figure showing a preferred embodiment of a cover according to the present invention.
Figure 2:
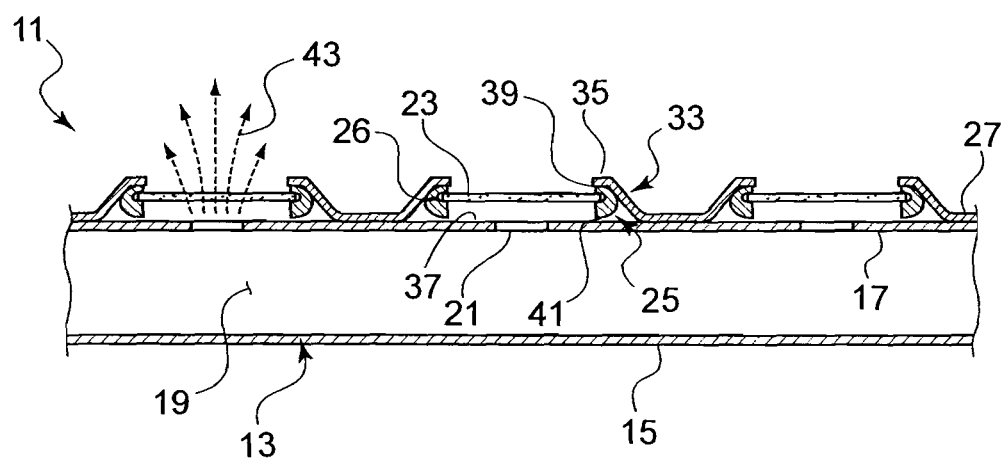
FIG. 2 is a cross-section view of the assembly of FIG. 1 taken along the line 2-2.

FIGS. 1 and 2 are front and cross-section views of a portion of a waveguide and cover assembly 11. Waveguide 13 is installed within an oven cook cavity and comprises an outer wall 15 and an inner wall 17. Walls 15, 17 are preferably made from sheet metal and are spaced from each other to form a waveguide cavity 19. Waveguide cavity 19 is in communication with a magnetron (not shown) or other electromagnetic energy emitter for guiding the emitted energy into the oven cavity. Slot antennas 21 are formed in inner wall 15 for permitting energy to be emitted through inner wall 17 into the cook cavity of the oven.

To prevent grease, food particles, or other materials within the oven cavity from entering waveguide cavity 19, ceramic cover plates, or windows 23, are located generally adjacent each slot antenna 21. In the embodiment shown, each window 23 is carried by a unitary o-ring gasket 25, which is retained in place by a cover plate 27. A peripheral edge of window 23 is sealingly carried in a groove 26, which is formed in an inner portion of gasket 25. Cover plate 27 is a rigid, generally planar member having flanges 29, 31 configured for attaching cover plate 27 to the oven wall. Cover plate 27 is preferably made from sheet metal, but may alternatively be made from other materials that are suitable for a high-temperature environment. For each slot antenna 21, a sealing flange 33 is formed in cover plate 27, each sealing flange 33 extending toward the oven cavity and having dimensions larger that those of slot antennas 21. Each sealing flange 33 has an inner rim 35 sized and configured for sealingly engaging gasket 25 about the periphery of window 23.

To seal windows 23 to waveguide 13, gasket 25 is clamped between rim 35 and inner surface 37 of inner wall 17. An inner sealing interface 39 is formed between gasket 25 and rim 35, and an outer sealing interface 41 is formed between gasket 25 and surface 37 of inner wall 17. This allows gasket 25 to provide sealing interfaces 39, 41 to prevent grease, moisture, or other matter form entering waveguide 13 from the oven cavity and provide a compliant foundation for accommodating local twisting, bending, and displacement of the associated sheet metal components. This foundation greatly reduces bending stresses on each window 23. In addition, the use of a separate smaller window for each slot antenna 21, as compared to a large sheet of material covering all slot antennas 21, reduces material costs and further reduces stress in windows 21 by permitting windows 21 to translate and rotate relative to each other. Sealing interfaces 39, 41 create a redundant sealing geometry, such that any grease, water, or cooking residue must pass by both sealing interfaces 39, 41 before entering slot antenna 21 and waveguide 13.

Figure 3:
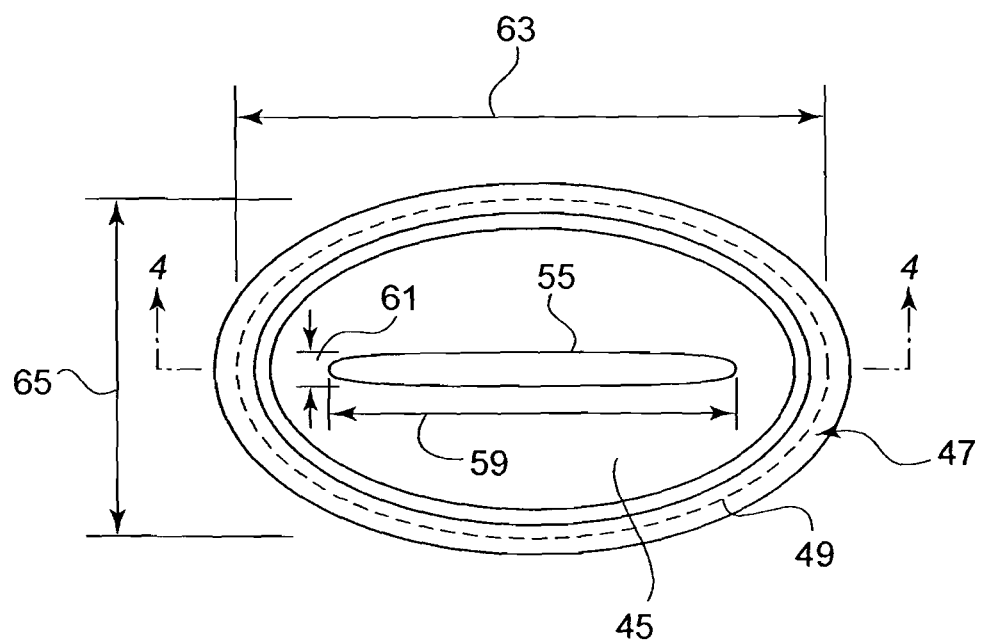
FIG. 3 is a front view of an alternative embodiment of a cover plate and gasket assembly according to the invention.
Figure 4:
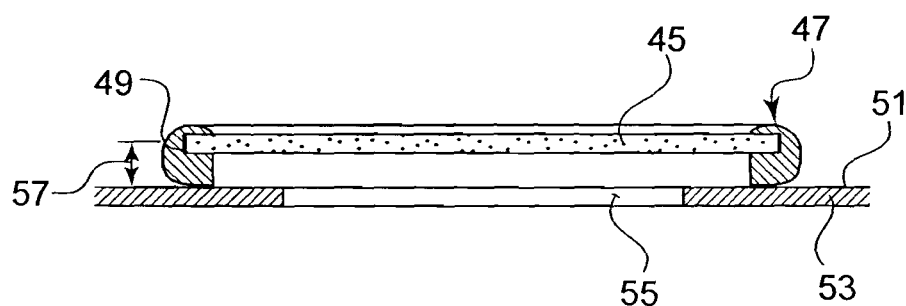
FIG. 4 is cross-section view of the assembly of FIG. 3 taken along the line 4-4.

Sealing flanges 33, which are spaced from inner wall 17, may act as reflectors to an energy beam 43 (with side lobes) emitted from slot antenna 21. Therefore, windows 23 must have enough viewing area relative to energy beam 43 to permit beam 43 to radiate from each antenna 21 with minimal reflection of power back to antennas 21. FIGS. 3 and 4 are enlarged views of an alternative embodiment of an assembly according to the invention. Window 45 is shown assembled with gasket 47, a groove 49 in gasket 47 sealingly engaging the peripheral edge of window 45. FIG. 4 is a cross-section view showing the assembly of window 45 and gasket 47 adjacent an inner surface 51 of an inner wall 53 of a waveguide, window 45 being located over a slot antenna 55.

In the embodiment shown, a clearance distance 57 from between inner surface 51 and window 45 is preferably less than approximately 0.375 in., and the thickness of window 45 is preferably less than approximately 0.125 in. As shown in FIG. 3, slot antenna 55 has a length dimension 59 of approximately 2.4 in. and a width dimension 61 of 0.25 in. To limit or eliminate reflection of energy emitted through antenna 55, window 45 is sized to have a preferred length dimension 63 of approximately 3.5 in. and a width dimension 65 of 2.5 in.

While shown in the embodiments as being a unitary gasket, the gasket that carries the windows may be formed as two pieces. In this configuration, at least one gasket piece is located between the rim of the sealing flange and the oven cavity side of the window, and at least one gasket piece is located between the inner surface of the waveguide inner wall and the waveguide side of the window.

While exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

The invention claimed is:

1. An antenna cover assembly for a high-temperature operating environment, comprising:
   a waveguide for installation within a cook cavity, the waveguide comprising an outer wall, an inner wall, and a plurality of slot antennae formed in the inner wall for permitting energy to be emitted through the inner wall into the cook cavity;
   at least one cover plate configured to cover one or more of the slot antenna, the at least one cover plate having an inner side and an outer side and a plate edge, and being translucent to at least one selected frequency of electromagnetic energy;
   one unitary gasket per cover plate, each unitary gasket comprising at least two elastomeric gasket portions, wherein one of the gasket portions is configured for sealingly engaging the plate edge against the inner side to provide an inner sealing interface, and wherein another gasket portion is configured for sealingly engaging the plate edge against the outer side to provide an outer sealing interface, wherein the gasket provides a clearance distance of about 0.375 inches or less between the cover plate and the inner wall of the waveguide;

a plurality of retainer plates adapted for attachment to a structure located in a high-temperature operating environment, each retainer plate having a sealing flange adapted for clamping one of the cover plates generally adjacent an antenna portion of a waveguide.

2. The antenna cover assembly according to claim 1, wherein each unitary gasket comprises a U-shaped gasket.

3. The antenna cover assembly according to claim 1, wherein each gasket comprises an inner groove configured for engaging a periphery of the cover plate.

4. The antenna cover assembly according to claim 1, wherein the sealing flange has a rim offset from a plane of one of the plurality of slot antenna.

5. The antenna cover assembly according to claim 1, wherein the cover plates are formed from a ceramic material.

6. The antenna cover assembly according to claim 1, wherein (a) the retainer plate further has a base portion and (b) the sealing flange comprises (i) a rim generally planar to the base portion and (ii) an angled member connecting the rim to the base portion.

7. An antenna cover assembly for a microwave oven, comprising:

a waveguide having an inner wall and a plurality of slot antenna formed in the inner wall, the waveguide being adapted for attachment in an oven;

at least one cover plate configured to cover one or more of the plurality of slot antenna, each cover plate having an inner side and an outer side and a plate edge, the cover plate being translucent to at least microwave frequency energy;

one unitary gasket per cover plate, each unitary gasket comprising at least two elastomeric gasket portions, wherein one of the gasket portions is configured for sealingly engaging the plate edge against the inner side to provide an inner sealing interface, and wherein another gasket portion is configured for sealingly engaging the plate edge against the outer side to provide an outer sealing interface, wherein the gasket provides clearance distance of about 0.375 inches or less between the cover plate and the inner wall of the waveguide;

a plurality retainer plates having a sealing flange for clamping one of the cover plates generally adjacent one of the plurality of slot antenna.

8. The antenna cover assembly according to claim 7, wherein each unitary gasket comprises a U-shaped gasket.

9. The antenna cover assembly according to claim 7, wherein each gasket comprises an inner groove configured for engaging a periphery of the cover plate.

10. The antenna cover assembly according to claim 7, wherein the sealing flange has a rim offset from a plane of one of the plurality of slot antenna.

11. The antenna cover assembly according to claim 7, wherein the cover plates are formed from a ceramic material.

\* \* \* \* \*